(12) United States Patent
Bruce et al.

(10) Patent No.: US 8,832,702 B2
(45) Date of Patent: Sep. 9, 2014

(54) THREAD DE-EMPHASIS INSTRUCTION FOR MULTITHREADED PROCESSOR

(75) Inventors: Klas M. Bruce, Leander, TX (US); Sergio Schuler, Austin, TX (US); Matt B. Smittle, Allen, TX (US); Michael D. Snyder, Austin, TX (US); Gary L. Whisenhunt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1649 days.

(21) Appl. No.: 11/746,998

(22) Filed: May 10, 2007

(65) Prior Publication Data

US 2008/0282251 A1   Nov. 13, 2008

(51) Int. Cl.
*G06F 9/46* (2006.01)
*G06F 9/30* (2006.01)
*G06F 9/38* (2006.01)
*G06F 9/48* (2006.01)

(52) U.S. Cl.
CPC .............. *G06F 9/485* (2013.01); *G06F 9/3009* (2013.01); *G06F 9/3834* (2013.01); *G06F 9/3013* (2013.01); *G06F 9/3851* (2013.01); *G06F 9/3824* (2013.01)
USPC .......................................................... 718/103

(58) Field of Classification Search
CPC ............................ G06F 9/4881; G06F 9/1263
See application file for complete search history.

(56) References Cited

U.S. PATENT DOCUMENTS

| 6,105,051 | A | 8/2000 | Borkenhagen et al. |
|---|---|---|---|
| 6,212,544 | B1 | 4/2001 | Borkenhagen et al. |
| 6,658,447 | B2 | 12/2003 | Cota-Robles et al. |
| 7,565,652 | B2 * | 7/2009 | Janssen et al. ................ 718/103 |
| 2001/0056456 | A1 | 12/2001 | Cota-Robles |
| 2002/0174166 | A1 | 11/2002 | Ang |
| 2004/0148606 | A1 | 7/2004 | Hosoe |
| 2004/0216105 | A1 | 10/2004 | Burky et al. |
| 2004/0216106 | A1 | 10/2004 | Kalla et al. |
| 2005/0021931 | A1 | 1/2005 | Anderson et al. |
| 2005/0022186 | A1 | 1/2005 | Accapadi et al. |
| 2007/0260863 | A1 | 11/2007 | Moyer et al. |

FOREIGN PATENT DOCUMENTS

| CN | 1276887 A | 12/2000 |
|---|---|---|
| EP | 0725335 A1 | 8/1996 |
| GB | 2321543 | 11/1997 |
| JP | 07110773 | 4/1995 |
| JP | 2002532801 | 2/2002 |
| JP | 200699569 | 4/2006 |
| WO | 9921083 | 4/1999 |
| WO | 0036487 | 6/2000 |

OTHER PUBLICATIONS

International Search Report issued in the coordinating PCT Application No. PCT/US2008/061713, mailed Aug. 21, 2008.

* cited by examiner

Primary Examiner — Mengyao Zhe

(57) ABSTRACT

A technique for scheduling execution of threads at a processor is disclosed. The technique includes executing a thread de-emphasis instruction of a thread that de-emphasizes the thread until the number of pending memory transactions, such as cache misses, associated with the thread are at or below a threshold. While the thread is de-emphasized, other threads at the processor that have a higher priority can be executed or assigned system resources. Accordingly, the likelihood of a stall in the processor is reduced.

20 Claims, 6 Drawing Sheets

THREAD DE-EMPHASIS INSTRUCTION FOR MULTITHREADED PROCESSOR

FIELD OF THE DISCLOSURE

The present disclosure relates to multithreaded processors and more particularly to thread management for multithreaded processors.

BACKGROUND

Stalls in an instruction pipeline due to cache misses or other memory transactions can reduce the efficiency of a processor. This problem is exacerbated in multithreaded processors, as a stall in the instruction pipeline due to one thread can delay execution of other threads. Some processors monitor the instruction pipeline for stalls independent of a program flow, and in response to a stall grant a thread other than the one causing the stall priority to be executed in the pipeline. However, monitoring for a stall in an instruction pipeline is typically difficult and requires additional overhead at the processor. Accordingly, there is a need for an improved technique for allocating processor resources to threads in a multithreaded processor.

DETAILED DESCRIPTION

Figure 1:
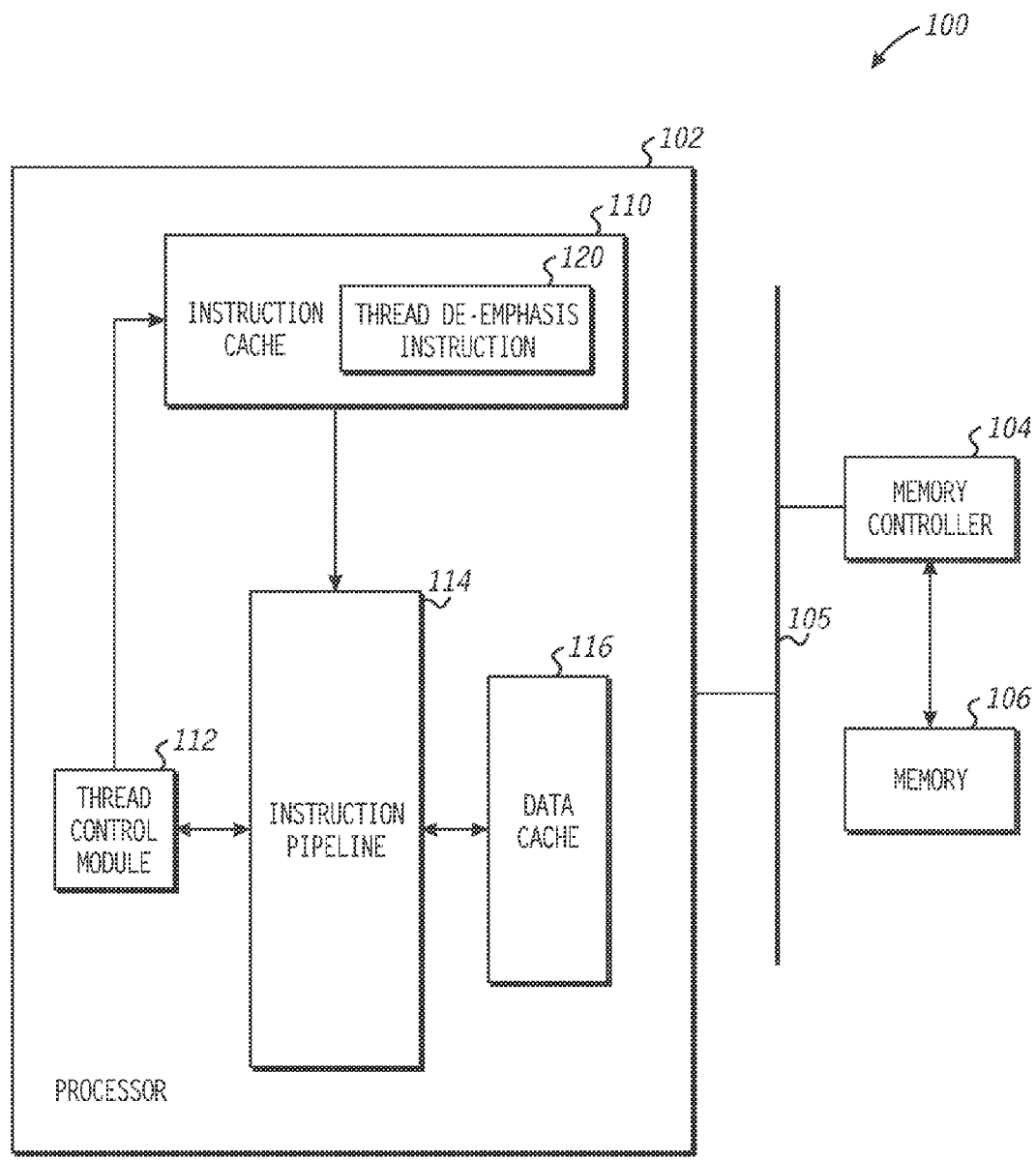
FIG. 1 is a block diagram of a particular embodiment of a data processing device.

A technique for scheduling execution of threads at a processor is disclosed. The technique includes executing a thread de-emphasis instruction of a thread that de-emphasizes the thread until the number of pending memory transactions, such as cache misses, associated with the thread are at or below a threshold. While the thread is de-emphasized, other threads at the processor that have a higher priority can be executed or assigned system resources. Accordingly, the likelihood of a stall in the processor is reduced.

In one embodiment, a thread de-emphasis instruction is an instruction in a program flow that de-emphasizes a first thread by changing the priority status of a first thread if the number of pending memory transactions associated with the first thread exceed a threshold. Once the number of pending memory transactions is at or below the threshold, the priority status of the first thread can be restored. The threshold can be based on an operand of the thread de-emphasis instruction, or can be a predefined value. In a particular embodiment, the threshold is zero, so that the thread de-emphasis instruction de-emphasizes a thread until all pending memory transactions associated with the thread have been resolved.

For example, a thread can be de-emphasized for a particular memory transaction type. The thread de-emphasis instruction can de-emphasize a thread based on the number of cache misses associated with that thread. Another thread de-emphasis instruction can de-emphasize the thread based on the number of non-cacheable memory accesses associated with the thread (i.e. the number of memory accesses to addresses identified as non-cacheable). Alternate embodiments may de-emphasize a thread based on a characteristic other than a number of memory transactions. In addition, alternate embodiments may de-emphasize a thread by changing a characteristic of the thread other than its priority status, such as changing a "ready to run" bit associated with the thread.

A de-emphasized thread is given lower priority for processor resources than other threads. For example, if the processor employs coarse-grain multithreading, so that only one thread is assigned to the instruction pipeline at a time, a de-emphasized thread will not be executed in the instruction pipeline until it is no longer de-emphasized relative to other threads. If the processor employs fine-grain multithreading, so that instructions associated with different threads can be executed at different stages of the instruction pipeline at a time, instructions associated with a de-emphasized program are not executed at a particular stage of the instruction pipeline until instructions associated with higher priority threads pending at that stage are executed. In addition, the de-emphasized thread can have lower priority than other threads for some stages of the instruction pipeline, but maintain its priority for other stages.

The de-emphasized thread can also be given lower priority for allocation of other processor resources. For example, the de-emphasized thread can be given lower priority for cache accesses, store queue accesses, completion buffer entries, instruction fetches, and the like. Further, a thread can be de-emphasized with respect to some threads but maintain priority relative to other threads.

Referring to FIG. 1, a block diagram of a particular embodiment of a data processing device 100 is illustrated. The data processing device 100 includes a processor 102, a memory controller 104, and a memory 106. The processor 102 and the memory controller are each connected to the bus 105. The memory 106 includes a bi-directional connection to the memory controller 104.

The memory controller 104 receives memory access information via the bus 105 and, based on that information, accesses the memory 106. The memory 106 can store software programs and routines including instructions for execution at the processor 102. The memory 106 can be volatile memory, such as RAM memory, or non-volatile memory, such as flash memory or a hard disk drive. In a particular embodiment, the memory 106 and the memory controller 104 are integrated on the same semiconductor substrate as the processor 102. In another particular embodiment, the memory 106 is on a separate semiconductor substrate than the processor 102 and the memory controller 104.

The processor 102 can be a microprocessor, a microcontroller, an ASIC, and the like. The processor 102 is a multithreaded processor that is configured to execute multiple threads. The threads can be associated with a different software program or routine, or can be associated with different tasks of a single software program or routine or a combination thereof.

In the illustrated embodiment of FIG. 1, the processor 102 includes an instruction cache 110, a thread control module 112, an instruction pipeline 114, and a data cache 116. The instruction cache 110 is accessible to the instruction pipeline 114 and the thread control module 112. The instruction pipeline 114 is accessible to the thread control module 112. In addition, the data cache 116 is accessible to the instruction pipeline 114.

The instruction cache 110 stores instruction data representing instructions for execution at the processor 102. The cached instruction data can be a copy of software program data stored at the memory 106.

The instruction pipeline 114 executes instructions to perform tasks, such as memory accesses, arithmetic operations, and the like. For example, in response to a particular instruction, the instruction pipeline 114 can access the data cache 116 to retrieve data. In response to another instruction, the instruction pipeline 114 can request data from the memory 106 via the memory controller 104, and store the requested data at the data cache 116.

The thread control module 112 stores state information to indicate the status for each thread, including the priority status for each thread. Based on the priority status and other attributes for each thread, the thread control module 112 allocates resources of the processor 102, such as by scheduling the order of execution of threads at the instruction pipeline 114. The thread control module 112 also tracks the number of pending memory transactions associated with each thread.

The instruction cache 110 includes an explicit thread de-emphasis instruction 120. During execution of the thread de-emphasis instruction 120, the instruction pipeline 114 notifies the thread control module 112 that the priority of the first thread should has been de-emphasized until the number of pending memory transactions associated with the first thread are at or below a threshold. In a particular embodiment, the thread de-emphasis instruction 120 is a special form of no-op instruction that indicates a thread should be de-emphasized until no memory transactions associated with the thread are pending.

In response to the execution of the thread de-emphasis instruction 120 at the instruction pipeline 114, the thread control module 112 adjusts the priority state of the first thread to de-emphasize the thread relative to other threads. In a particular embodiment, this is done by clearing a "ready-to-run" bit associated with the thread. As long as this bit is cleared, the thread will be given low priority for execution. Even when the bit is cleared the thread control module can keep track of other priority information for the thread, so that when the ready-to-run bit is set, the thread is given the appropriate priority. In addition, the thread control module 112 monitors the instruction pipeline 114 and keeps track of the number of pending memory transactions associated with the first thread. Once the number of pending memory transactions indicated by the thread de-emphasis instruction 120 have been resolved, the thread control module 112 sets the priority state so that the first thread is no longer de-emphasized.

Accordingly, the thread de-emphasis instruction 120 can be used to de-emphasize a particular thread until the number of memory transactions associated with that thread is at or below a threshold. This allows a programmer or a compiler to allocate the resources of the instruction pipeline 114 efficiently. For example, the thread de-emphasis instruction 120 can be implemented in the program flow of a thread following or preceding instructions that the user believes will cause a stall in the instruction pipeline 114, such as after a series of load instructions that can result in a large number of cache misses. The thread is de-emphasized until the memory transactions associated with the load instructions are resolved, allowing the instruction pipeline 114 to execute instructions associated with other threads while the memory transactions are being resolved.

Figure 2:
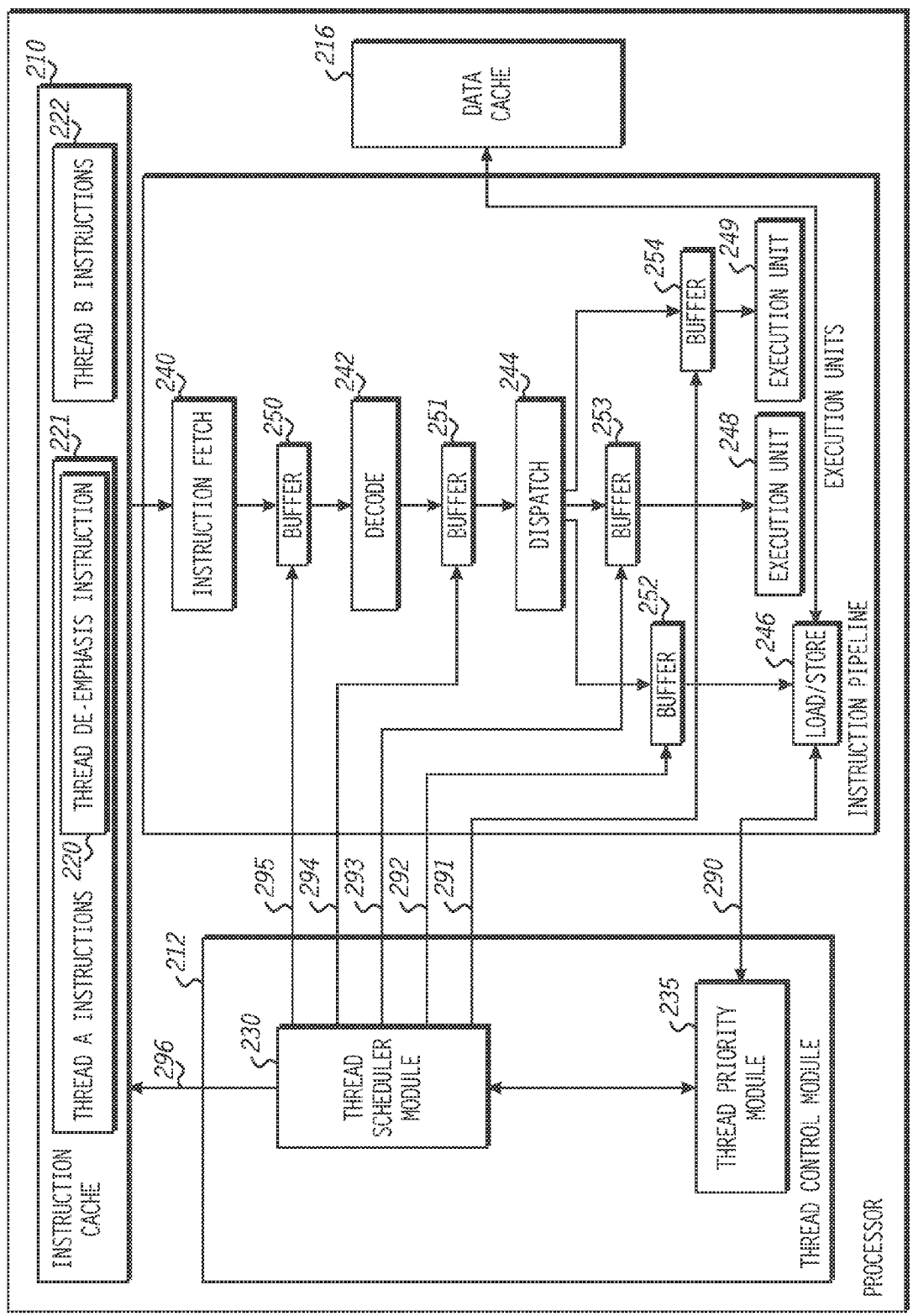
FIG. 2 is a block diagram of a particular embodiment of a processor of FIG. 1.

Referring to FIG. 2, a block diagram of a processor 202, corresponding to a processor such as processor 102 of FIG. 1, is illustrated. The processor 202 includes an instruction cache 210, a thread control module 212, an instruction pipeline 214, and a data cache 216. The instruction cache 210 is accessible by the thread control module 212 via a bus 296 and by the instruction pipeline 214. The data cache 216 is accessible by the instruction pipeline 214.

The instruction cache 210 includes sets of instructions associated with threads, including Thread A instructions 221 and Thread B instructions 222. The Thread A instructions 221 include thread de-emphasis instruction 220 to de-emphasize Thread A relative to Thread B until pending memory transactions associated with Thread A have been resolved.

The thread control module 212 includes a thread scheduler module 230 connected to a thread priority module 235. The thread priority module 235 includes an input connected to a bus 290 to receive indications that memory transactions for threads have been completed. The thread scheduler module 230 includes outputs connected to a bus 291, a bus 292, a bus 293, a bus 294, a bus 295, and the bus 296. The thread scheduler module 230 provides control information on each of the busses 291-296 to schedule execution of instructions at stages of the instruction pipeline 214.

The thread priority module 235 stores priority state information for each thread at the processor 202, including Thread A and Thread B, and provides priority status information to the thread scheduler module 230 based on the priority state information. Based on the priority status information the thread scheduler module 230 provides control information on the busses 291-296 to schedule execution of instructions at stages of the instruction pipeline 214.

The instruction pipeline 214 includes an instruction fetch stage 240, a decode stage 242, a dispatch stage 244, and a load/store unit 246, an execution unit 248, and an execution unit 249. The execution units 248 and 249 can be load/store units, floating point arithmetic units, integer arithmetic units, and the like. The instruction pipeline 214 also includes buffers 250-254.

The instruction fetch stage 240 includes an input connected to the instruction cache 210 and an output. The buffer 250 includes an input connected to the output of the instruction fetch stage 240, an input connected to the bus 295, and an output. The decode stage 242 includes an input connected to the output of the buffer 250 and an output. The buffer 251 includes an input connected to the output of the decode stage 240, an input connected to the bus 294, and an output. The dispatch stage 244 includes an input connected to the output of the buffer 251 and three outputs.

The buffer 252 includes an input connected to a first output of the dispatch stage 244, an input connected to the bus 292, and an output. The load/store unit 246 includes an input connected to the output of the buffer 251, a connection to the bus 290, and a connection to the data cache 216.

The buffer 253 includes an input connected to a second output of the dispatch stage 244, an input connected to the bus 293, and an output. The execution unit 248 includes an input connected to the output of the buffer 253. The buffer 254 includes an input connected to a third output of the dispatch stage 244, an input connected to the bus 291, and an output. The execution unit 249 includes an input connected to the output of the buffer 254.

The instruction fetch stage 240 fetches instruction data from the instruction cache 210 and provides the fetched instruction data to the buffer 250. Based on control information received via the bus 293, the decode portion 242 accesses instructions from the buffer 250.

The decode stage 242 decodes instructions accessed at the buffer 250 and provides decoded instructions to the buffer 251. Based on control information received via the bus 292, the dispatch stage accesses decoded instructions at the buffer 251. The dispatch stage 244 determines which execution unit of the load/store unit 246, the execution unit 248, and the execution unit 249, and based on the determination sends the decoded instruction to one of the buffers 252-254.

The buffer 252 stores decoded instructions provided by the dispatch stage 244 and. Based on control information provided via the bus 292, the load/store unit 246 accesses the decoded instructions. Based on instructions received from the buffer 252, the load/store unit 246 executes load and store operations at the data cache 216. In addition, the load/store unit can execute load and store operations on memory external to the processor 202. For example, in the event of a cache miss at the data cache 216, the load/store unit resolves the cache miss by loading data associated with the cache miss from external memory to the data cache 216. Further, the load/store provides information about pending memory transactions for each thread via the bus 290. For example, after a cache miss associated with a thread has been resolved, the load/store unit 246 provides information via the bus 290 indicating that the number of pending cache misses associated with the thread has been reduced by one.

The buffer 253 stores decoded instructions provided by the dispatch stage 244. Based on control information provided via the bus 293, the execution unit 248 accesses the decoded instructions. The execution unit 248 executes the instructions provided by the buffer 253. The buffer 254 stores decoded instructions provided by the dispatch stage 244. Based on control information provided via the bus 291, the execution unit 249 accesses the decoded instructions. The execution unit 249 executes the instructions accessed at the buffer 254.

During operation, the thread scheduler module 230 receives priority information from the thread priority module 235. Based on the priority information, the thread scheduler module 230 provides control information to the buffers 250-254, as well as the instruction cache 210, to control allocation of processor resources, including the order of execution for thread instructions at each stage of the instruction pipeline 214. For example, based on the received priority information the thread scheduler module 230 may determine that the Thread A instructions 221 should be given priority over the Thread B instructions 222 at the decode stage 242. Accordingly, the thread scheduler module 230 provides control information via the bus 295 to the buffer 250 so that Thread A instructions stored in the buffer 250 are provided to the decode stage 242 before Thread B instructions stored in the buffer 250 are provided. Accordingly, by providing appropriate control information to the instruction cache 210 and the buffers 250-254, the thread scheduler module 230 controls the order of execution of thread instructions at each stage of the instruction pipeline 214.

The thread scheduler module 230 determines the order of execution of thread instructions based on priority information stored at the thread priority module 235. The thread priority information can be altered by execution of the thread de-emphasis instruction 220 at the load/store unit 246. In response to execution of the thread de-emphasis instruction 220, the load/store unit 246 provides information to the thread priority module 235, indicating that Thread A should be de-emphasized until the number of pending memory transactions associated with the thread is below a threshold. The load/store unit 246 can also provide information to set the threshold based on an operand of the thread de-emphasis instruction 220.

In response, the thread priority module 235 determines the number of pending memory transactions associated with Thread A and, if the number is above the threshold, change the priority state associated with Thread A so that it is de-emphasized with respect to Thread B.

As the load/store unit 246 resolves pending memory transactions associated with Thread A, it notifies the thread priority module 235 via the bus 290. In response, the thread priority module 235 adjusts the number of pending memory transactions associated with Thread A and when the number of memory transactions is below the threshold, adjusts the priority state for Thread A so that it is no longer de-emphasized with respect to Thread B. Accordingly, the priority status of Thread A is automatically restored to its previous status when the number of pending memory transactions moves below the threshold.

Figure 3:
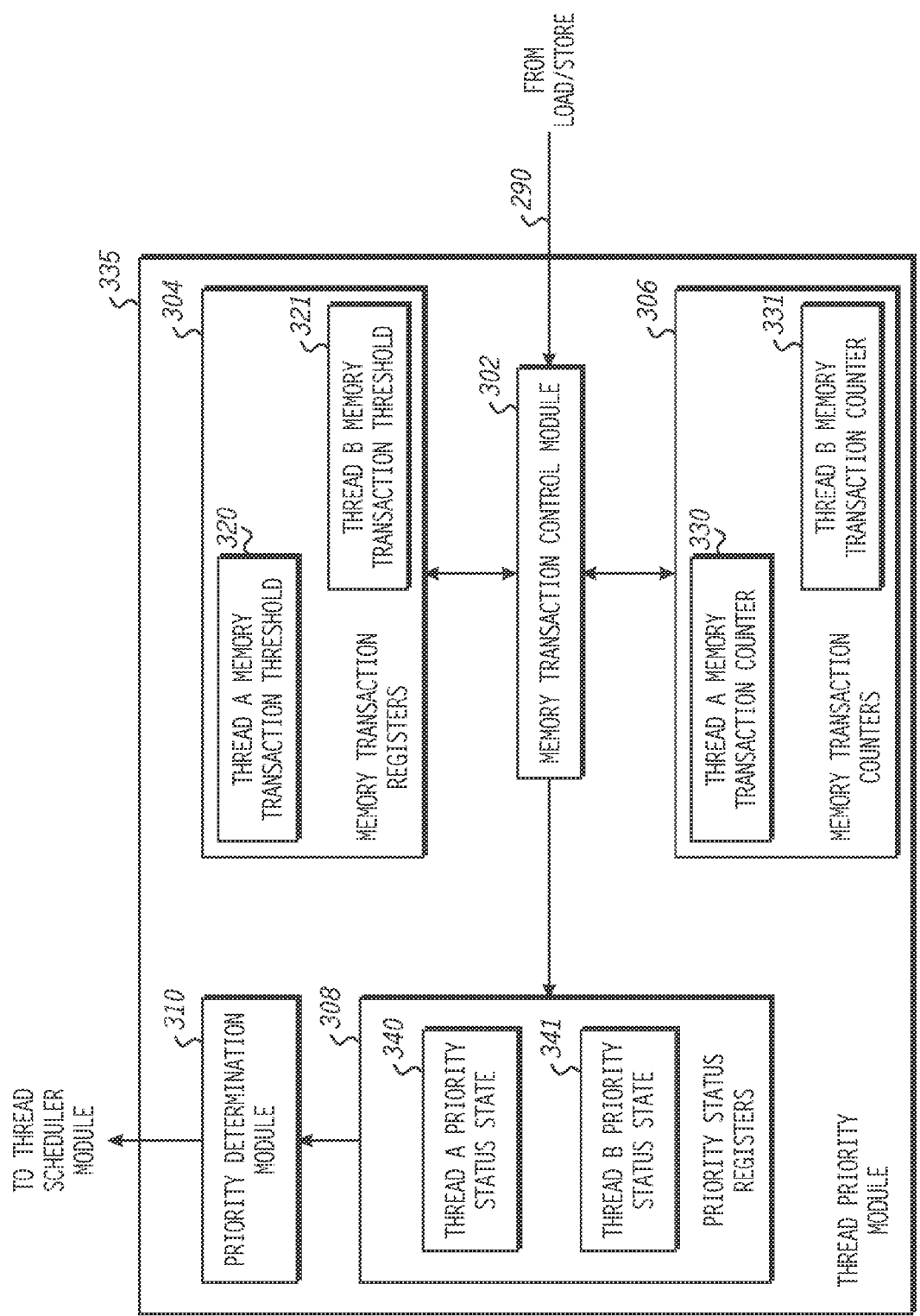
FIG. 3 is a block diagram of a particular embodiment of a thread priority module of FIG. 2.

Referring to FIG. 3, a block diagram of a particular embodiment of a thread priority module 335, corresponding to the thread priority module 235 of FIG. 2, is illustrated. The thread priority module 335 includes a memory transaction control module 302, a set 304 of memory transaction registers, a set 306 of memory transaction counters, a set 308 of priority status registers, and a priority determination module 310. The memory transaction control module 302 includes bi-directional connections to the set 304 of memory transaction registers and to the set 306 of memory transaction counters. The memory transaction control module also includes an input from the load/store unit 246 (FIG. 2) and an output. The set 308 of priority status registers includes an input connected to the output of the memory transaction control module 302 and an output. The priority determination module 310 includes an input connected to the output of the set 308 of priority status registers and an output connected to the thread scheduler module 230 (FIG. 2).

The memory transaction control module 302 is configured to receive control information from the load/store unit 246 and based on that information adjust the values stored in the set 304 of memory transaction registers 304, the set 306 of memory transaction counters, and the set 308 of priority status registers as appropriate.

The set 304 of memory transaction registers includes a register 320 to store a memory transaction threshold value associated with Thread A and a register 321 to store a memory transaction threshold value associated with Thread B. The memory transaction threshold values stored in the registers 320 and 321 can be set by the memory transaction control module 302 based on information provided by the load/store unit 246, such as information based on an operand of a thread de-emphasis instruction. In an alternative embodiment the memory transaction threshold values are values fixed by a ROM memory, an operating system, and the like.

The set of memory transaction counters 306 includes a counter 330 that stores a number of pending memory transactions associated with Thread A and a counter 331 that stores a number of pending memory transactions associated with Thread B. The memory transaction control module 302 can individually adjust the values stored in the counters 330 and 331.

The set of priority status registers 308 includes a register 340 that stores priority status state information associated with Thread A and a register 341 that stores priority status state information associated with Thread B. The memory transaction control module 302 can individually adjust the state information stored in the registers 340 and 341.

The priority determination module determines the priority status for Thread A and Thread B based on the priority status state information stored in the registers 340 and 341. Based on the priority status for each thread, the priority determination module provides control information to the thread scheduler module 230 so that instructions associated with each thread are executed in the appropriate order at each of the stages of the instruction pipeline 214 (FIG. 2).

During operation, the memory transaction control module 302 receives information from the load/store unit 246 indicating that a memory transaction associated with a thread is pending, or that a memory transaction associated with a thread has been resolved. In response, the memory transaction control module 302 adjusts the values stored in the set of memory transaction counters 306.

For example, the load/store unit 246 can indicate to the memory transaction control module 302 that a cache miss has occurred due to an instruction associated with Thread A. In response, the memory transaction control module 302 adjusts the value stored in the counter 330 to reflect that the cache miss is pending. After the cache miss has been resolved (i.e. by retrieving data from external memory and loading it to the data cache 216 (FIG. 2)), the load/store unit 246 indicates resolution of the cache miss to the memory transaction control module 302. In response, the memory transaction control module 302 adjusts the value stored in the counter 330 to reflect that the memory transaction has been resolved. Accordingly, the values stored in the counters 330 and 331 reflect the number of pending memory transactions associated with Thread A and Thread B, respectively.

In addition, the load/store unit 246 can provide information to the memory transaction control module 302 indicating that a thread de-emphasis instruction associated with a thread has been received. In response, the memory transaction control module 302 compares the number of pending memory transactions associated with the thread, as reflected in the set of memory transaction counters 306, with the memory transaction threshold associated with the thread, as reflected in the set of memory transaction registers 304. Based on the comparison, the memory transaction control module 302 adjusts the priority status for the thread by adjusting the status state for the thread at the set of priority status registers 308.

For example, if the thread de-emphasis instruction is associated with Thread B, the memory transaction control module 302 compares the value stored in counter 331 with the threshold value stored in the register 321. If the comparison indicates that the number of pending memory transactions associated with Thread B is above the threshold, the memory transaction control module 302 adjusts the value stored by the register 321 so that Thread B is de-emphasized.

Figure 4:
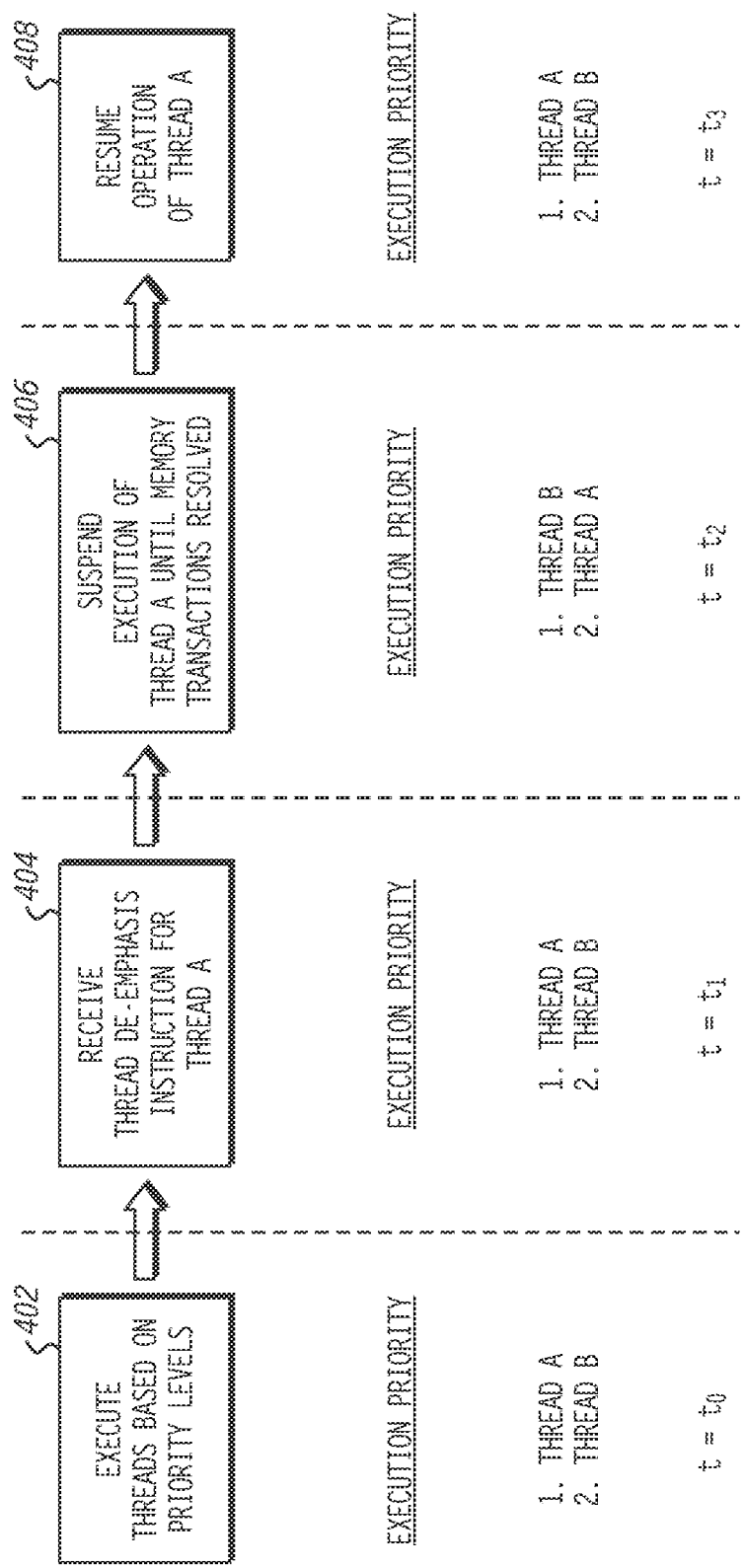
FIG. 4 is a diagram illustrating a particular embodiment of a method of scheduling threads.

Referring to FIG. 4, a diagram of a particular embodiment of a method of scheduling execution of threads is illustrated. At block 402, the threads are executed based on the priority status for each thread at time $t_0$. In the illustrated example, Thread A has priority over Thread B, so that Thread A instructions are executed before Thread B instructions.

At block 404, a thread de-emphasis instruction in Thread A is processed at time $t_1$. The execution of the thread de-emphasis instruction causes a de-emphasis of Thread A, thereby giving Thread B the highest priority. Accordingly, at block 406, the execution of Thread A is suspended until pending memory transactions associated with Thread A have been resolved. Thus, in the illustrated embodiment, only Thread B instructions are executed at time $t_2$ until the pending memory transactions for Thread A have been resolved.

Moving to block 408, after the pending memory transactions for Thread A have been resolved, the priority status for Thread A is restored at time $t_3$. Thus, as illustrated Thread A regains priority of execution over Thread B.

Figure 5:
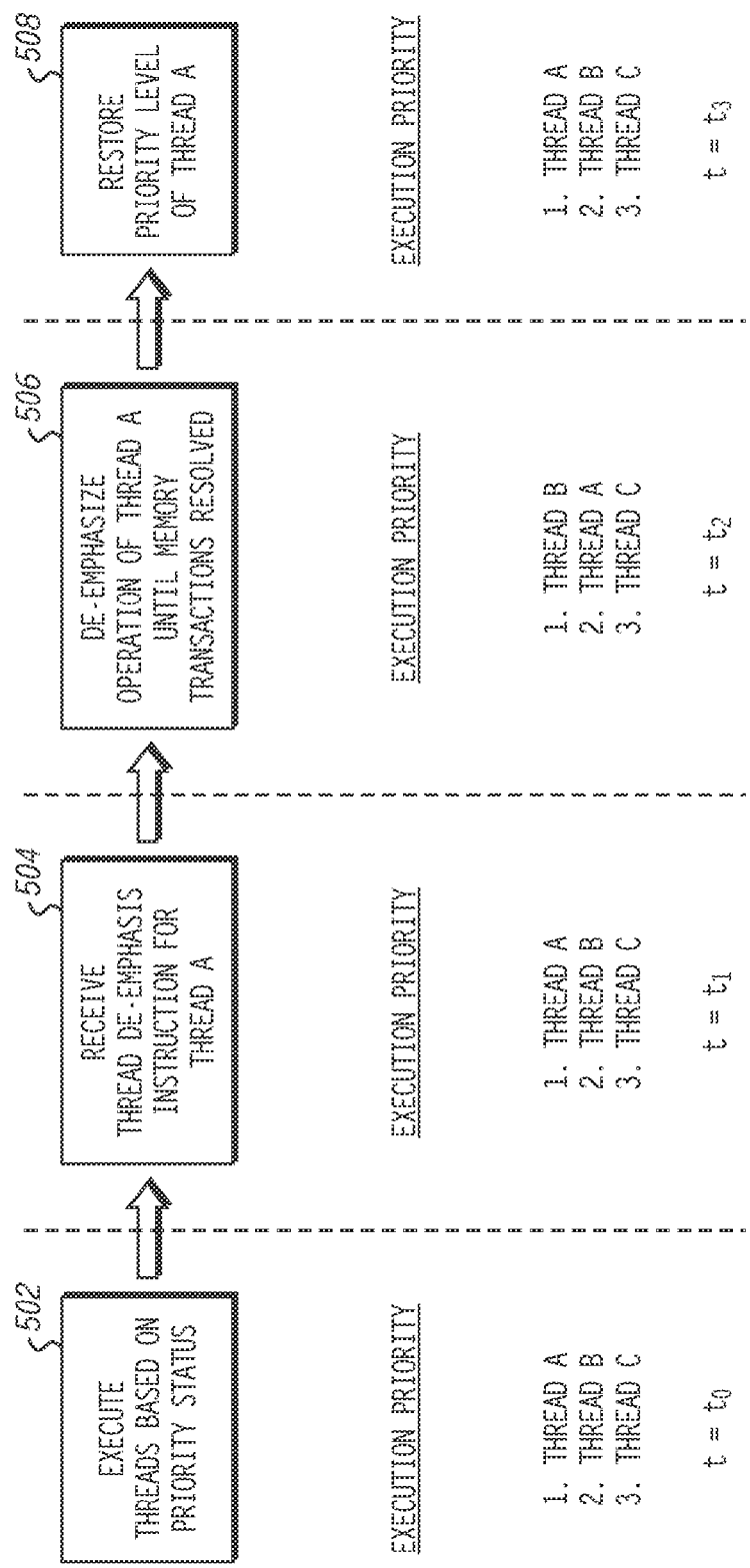
FIG. 5 is a diagram illustrating another particular embodiment of a method of scheduling threads.

Referring to FIG. 5, a diagram of another particular embodiment of a method of scheduling execution of threads is illustrated. At block 502, the threads are executed based on the priority status for each thread at time $t_0$. In the illustrated example, Thread A has priority over Thread B and Thread C, while Thread B also has priority over Thread C.

At block 504, a thread de-emphasis instruction for Thread A is received at time $t_1$, resulting in de-emphasis of Thread A. Accordingly, at block 506, Thread A is de-emphasized until pending memory transactions associated with Thread A have been resolved. Thus, in the illustrated embodiment, at block 506 Thread B has priority of execution over Thread A at time $t_2$. However, Thread A maintains priority over Thread C. Thus, in the illustrated example threads can be de-emphasized with respect to other threads individually.

Moving to block 508, after the pending memory transactions for Thread A have been resolved, the priority status for Thread A is restored at time $t_3$. Thus, as illustrated Thread A regains priority of execution over Thread B.

Figure 6:
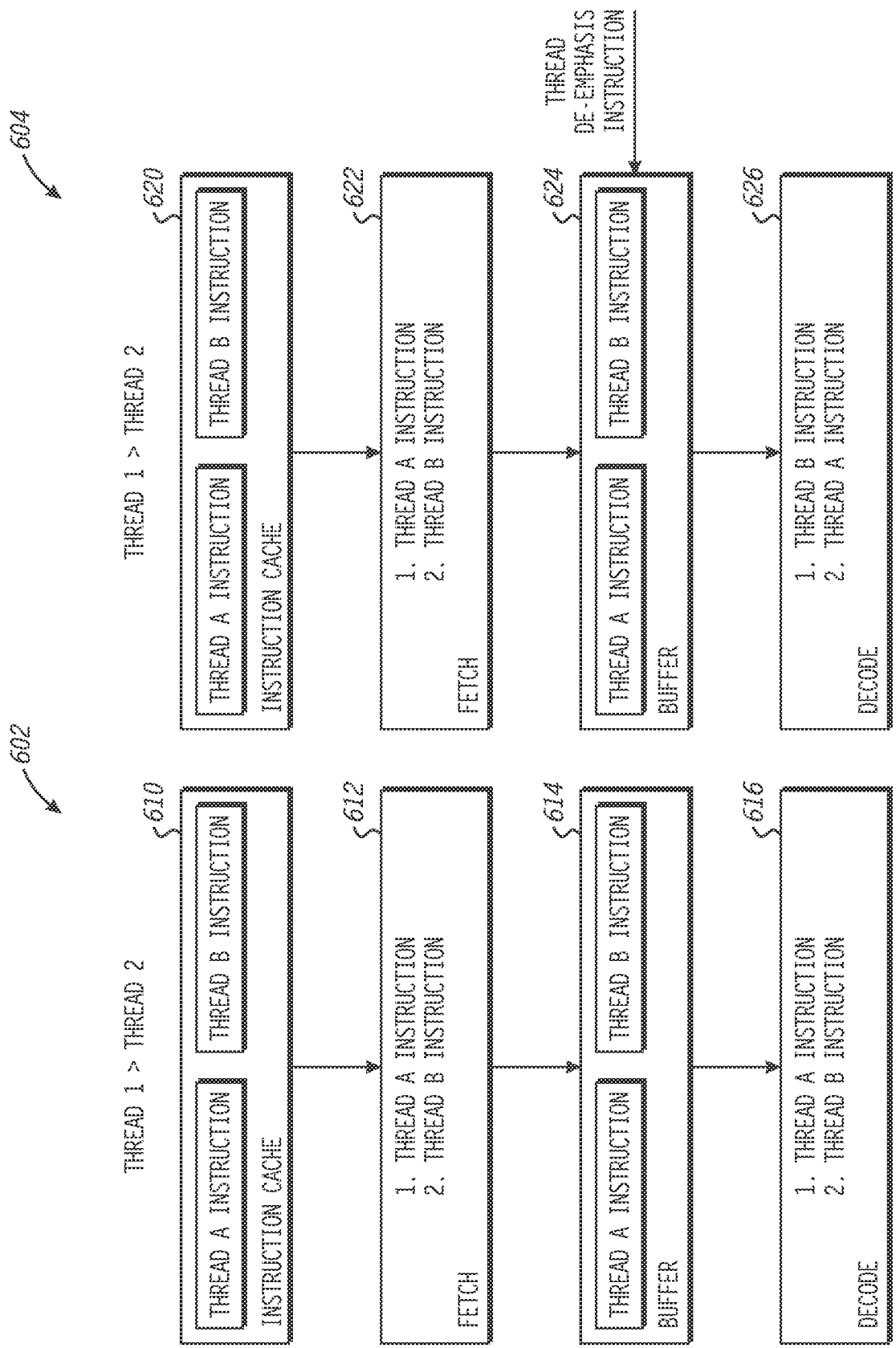
FIG. 6 is a diagram illustrating a particular embodiment of example methods of scheduling threads.

Referring to FIG. 6, a block diagram illustrating exemplary methods 602 and 604 of scheduling execution of threads at an instruction pipeline are illustrated. Method 602 illustrates the scheduling of threads at the instruction pipeline in the absence of a thread de-emphasis instruction. In contrast, method 604 illustrates the scheduling of threads at the instruction pipeline when a thread de-emphasis instruction is executed from Thread A. As illustrated, for both methods 602 and 604, absent explicit de-emphasis, Thread A normally has priority of execution over Thread B.

Referring to method 602, at block 610 two instructions are stored at an instruction cache, the first associated with Thread A, the second associated with Thread B. At block 612, the fetch stage of the instruction pipeline retrieves the instructions according to the current priority status for each instruction, so that the Thread A instruction is retrieved prior to the Thread B instruction.

At block 614, the two instructions are stored in a buffer for a decode stage of the instruction pipeline. At block 616, the instructions are decoded based on the current priority status for each instruction, so that the Thread A instruction is decoded prior to the Thread B instruction. Accordingly, if the Thread A instruction results in a stall, the Thread B instruction is not decoded until the stall is resolved.

Referring to method 604, at block 620 two instructions are stored at an instruction cache, the first associated with Thread A, the second associated with Thread B. At block 622, the fetch stage of the instruction pipeline retrieves the instructions according to the current priority status for each instruction, so that the Thread A instruction is retrieved prior to the Thread B instruction.

At block 624, the two instructions are stored in a buffer for a decode stage of the instruction pipeline. As illustrated, at block 624 the buffer receives control information indicating that a thread de-emphasis instruction associated with Thread A has been executed at another stage of the instruction pipeline. In response to the thread de-emphasis instruction the priority status for Thread A is de-emphasized with respect to Thread B. Accordingly, at block 626, the instructions are decoded based on the current priority status for each instruction, so that the Thread B instruction is decoded prior to the Thread A instruction. Accordingly, if the Thread A instruction results in a stall, the Thread B instruction is decoded while the stall is resolved, resulting in more efficient operation of the instruction pipeline relative to the method 602.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "or" are intended to cover an inclusive "or" such that if both conditions of the "or" conditional are satisfied, then the conditional is satisfied. The term "range" can include a range that includes only a single value.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. For example, although the performance event monitoring techniques disclosed herein have been discussed with respect to a single processor, similar techniques could be employed for devices having multiple processor cores. Each processor core could be associated with a different performance event monitor or each performance event monitor of a device could be associated with multiple processor cores. The specification and drawings should be considered exemplary only, and the scope of the disclosure is accordingly intended to be limited only by the following claims and equivalents thereof.

What is claimed is:

1. A method, comprising:
   executing at an instruction pipeline a first thread de-emphasis instruction contained in a set of instructions of a first thread at a processor; and
   in response to executing the first thread de-emphasis instruction:
      determining a comparison between a number of pending memory transactions associated with the first thread and a first threshold; and
      de-emphasizing a priority status of the first thread based on the comparison.

2. The method of claim 1, further comprising suspending execution of the first thread in response to de-emphasizing the priority status of the first thread.

3. The method of claim 1, further comprising executing a second thread at the processor while the priority status of the first thread is de-emphasized.

4. The method of claim 1, further comprising assigning processor resources at the processor based on the priority status of the first thread.

5. The method of claim 1, further comprising:
   while the priority status of the first thread is de-emphasized, receiving an indication of a change in the number of pending memory transactions associated with the first thread; and
   restoring the priority status of the first thread to a second state in response to the indication.

6. The method of claim 5, further comprising:
   suspending execution of the first thread in response to de-emphasizing the priority status of the first thread; and
   resuming execution of the first thread in response to restoring the priority status of the first thread.

7. The method of claim 1, wherein the number of pending memory transactions associated with the first thread is based on a number of cache misses associated with the first thread.

8. The method of claim 1, wherein the number of pending memory transactions associated with the first thread is based on a number of non-cacheable memory transactions associated with the first thread.

9. The method of claim 1, wherein the number of pending memory transactions associated with the first thread is associated with a first memory transaction type, the first memory transaction type based on the first thread de-emphasis instruction.

10. The method of claim 1, wherein the first threshold is based on an operand of the first thread de-emphasis instruction.

11. The method of claim 1, wherein the first thread de-emphasis instruction is a no-op instruction.

12. The method of claim 1, further comprising:
    receiving a second thread de-emphasis instruction of a second thread at the processor;
    in response to receiving the second thread de-emphasis instruction de-emphasizing a priority status of the second thread based on a first relationship between a number of pending memory transactions associated with the second thread and a second threshold.

13. A device, comprising:
    an instruction pipeline configured to execute instructions of a plurality of threads; and
    a thread control module comprising:
       a thread scheduler module configured to schedule execution of instructions of the plurality of threads at the instruction pipeline based on a priority level of each of the plurality of threads; and
       a priority control module configured to de-emphasize the priority status of a first thread of the plurality of threads and to restore the priority status of the first thread based on a comparison of a number of pending memory transactions associated with the first thread and a first threshold, the de-emphasis and the comparison in response to execution of a first thread de-emphasis instruction contained in a set of instructions of the first thread.

14. The device of claim 13, wherein the thread scheduler module is configured to suspend execution of the first thread in response to de-emphasizing the priority status of the first thread.

15. The device of claim 13, wherein the thread scheduler module is configured to allocate resources of the instruction pipeline based on a priority status of each of the plurality of threads.

16. The device of claim 13, wherein:
the priority control module is configured to set the priority level of a second thread of the plurality of threads to a first state in response to execution of a second instruction at the instruction pipeline, the priority level of the second thread set to the first state based on a first relationship between a number of pending memory transactions associated with the second thread and a second threshold.

17. The device of claim 13, wherein the first threshold is based on an operand of the first thread de-emphasis instruction.

18. The device of claim 13, wherein the number of pending memory transactions associated with the first thread is based on a number of cache misses associated with the first thread.

19. The device of claim 13, wherein the number of pending memory transactions associated with the first thread is based on a number of non-cacheable memory transactions associated with the first thread.

20. A device, comprising:
an instruction pipeline configured to execute instructions of a plurality of threads, each of the plurality of threads scheduled for execution at the instruction pipeline according to a corresponding priority level; and
in response to a thread de-emphasis instruction contained in a set of instructions of a thread, the instruction pipeline to determine a comparison between a number of pending memory transactions associated with the thread and a threshold.

* * * * *